(12) United States Patent
Shin et al.

(10) Patent No.: US 12,194,930 B2
(45) Date of Patent: Jan. 14, 2025

(54) SOUND-ABSORBING AIR DUCT FOR VEHICLE CONTAINING POLYESTER FIBER WITH LOW MELTING POINT

(71) Applicant: HUVIS CORPORATION, Seoul (KR)

(72) Inventors: Hyun Wook Shin, Daejeon (KR); Min Sung Lee, Daejeon (KR); Jae Min Choi, Daejeon (KR); Sung Yeol Kim, Sejong-si (KR); Seong Yoon Park, Daejeon (KR)

(73) Assignee: HUVIS CORPORATION, Seoul (KR)

(*) Notice: Subject to any disclaimer, the term of this patent is extended or adjusted under 35 U.S.C. 154(b) by 416 days.

(21) Appl. No.: 17/005,660

(22) Filed: Aug. 28, 2020

(65) Prior Publication Data

US 2021/0061193 A1   Mar. 4, 2021

(30) Foreign Application Priority Data

Aug. 30, 2019 (KR) .......................... 10-2019-0106956

(51) Int. Cl.
*B60R 13/08* (2006.01)
*B32B 5/02* (2006.01)
(Continued)

(52) U.S. Cl.
CPC .......... *B60R 13/0846* (2013.01); *B32B 5/022* (2013.01); *B32B 5/10* (2013.01); *B32B 5/26* (2013.01); *B32B 27/12* (2013.01); *B32B 27/36* (2013.01); *C08G 63/183* (2013.01); *D04H 1/435* (2013.01); *D04H 1/4374* (2013.01); *D04H 1/5412* (2020.05); *D04H 1/559* (2013.01);

(Continued)

(58) Field of Classification Search
CPC ....... D01F 8/14; B60R 13/0846; C08G 63/00; C08G 63/183
See application file for complete search history.

(56) References Cited

U.S. PATENT DOCUMENTS

| 5,380,816 A * | 1/1995 | Sullivan ................. C08G 63/18 |
| | | 427/385.5 |
| 10,975,219 B2 * | 4/2021 | Jang .......................... B32B 5/18 |
| 2013/0112499 A1 * | 5/2013 | Kitchen ............... G10K 11/168 |
| | | 442/268 |

FOREIGN PATENT DOCUMENTS

| KR | 10-1417458 B1 | 7/2014 | |
| WO | WO-2018021615 A1 * | 2/2018 | ............. B32B 5/022 |

OTHER PUBLICATIONS

Machine translation for KR 2014/0074554. (Year: 2014).*

* cited by examiner

*Primary Examiner* — Peter Y Choi
(74) *Attorney, Agent, or Firm* — Hauptman Ham, LLP

(57) ABSTRACT

A sound-absorbing air duct for a vehicle includes a lower non-woven fabric and an upper non-woven fabric sandwiching wires therebetween; and a film made of a polyester resin having a low melting point and disposed on the upper non-woven fabric, wherein each of the lower and upper non-woven fabrics includes a mixture between a first polyester fiber containing a polyester resin having a melting point higher than 250° C. and a second polyester fiber containing a polyester resin having a low melting point and having a softening point of 100° C. to 150° C., wherein the second polyester fiber includes a polyester resin having a low melting point composed of: an acid component including terephthalic acid or an ester-forming derivative thereof; and a diol component including 2-methyl-1,3-propanediol, 2-methyl-1,3-pentanediol, and ethylene glycol.

7 Claims, 1 Drawing Sheet

(51) Int. Cl.
*B32B 5/10* (2006.01)
*B32B 5/26* (2006.01)
*B32B 27/12* (2006.01)
*B32B 27/36* (2006.01)
*C08G 63/183* (2006.01)
*D04H 1/435* (2012.01)
*D04H 1/4374* (2012.01)
*D04H 1/541* (2012.01)
*D04H 1/559* (2012.01)

(52) U.S. Cl.
CPC . *B32B 2262/0276* (2013.01); *B32B 2307/102* (2013.01); *B32B 2605/00* (2013.01); *D10B 2331/04* (2013.01); *D10B 2505/04* (2013.01); *D10B 2505/12* (2013.01)

SOUND-ABSORBING AIR DUCT FOR VEHICLE CONTAINING POLYESTER FIBER WITH LOW MELTING POINT

CROSS-REFERENCE TO RELATED APPLICATION

This application claims the benefit of Korean Application No. 10-2019-0106956 filed on Aug. 30, 2019 with the Korean Intellectual Property Office, the disclosure of which is incorporated herein by reference.

BACKGROUND OF THE INVENTION

1. Field of the Invention

The present disclosure relates to a sound-absorbing air duct for a vehicle containing a polyester fiber having a low melting point. More specifically, the present disclosure relates to a sound-absorbing air duct for a vehicle containing a polyester fiber having a low melting point, in which the air duct is made of a polyester-based resin and thus is easily recycled and is easily manufactured using a fiber having a low melting point.

2. Description of the Related Art

An intake system for supplying inhaled air to an automobile engine includes an air duct as a path through which external air is sucked, an air cleaner 2 for purifying air introduced into the air duct, and an intake manifold connected to a surge tank. A resonator or the like for reducing noise generated from the engine is installed in the air duct.

A method for reducing a sound discharged from the engine and the like by the intake system includes a method of reducing the engine discharge noise of a specific frequency by installing the resonator in the air duct, and a method of adopting the air duct as a porous duct or an acoustic duct made of a plastic material.

A conventional sound-absorbing air duct may use a non-woven fabric having many pores and various pore sizes to reduce noises caused by air flow and pulsation noise generated in the engine.

Unlike the conventional plastic-based sound-absorbing duct, in the sound-absorbing air duct based on the non-woven fabric material, sound-absorbing performance is imparted to the sound-absorbing air duct itself. The sound-absorbing air duct based on the non-woven fabric material is manufactured using various synthetic resins such as polyvinyl chloride (PVC) resin, polyurethane (PU) resin, and polyethylene terephthalate (PET) resin.

In one example, Korean Patent No. 1417458 relates to a sound absorption air duct for a vehicle, and, more specifically, to a sound absorption air duct for a vehicle, which is manufactured through the simplification of a process of bonding a polyurethane film on non-woven fabric so that the sound absorption performance of an intake system can be improved. Thus, the sound absorption air duct for a vehicle and a manufacturing method thereof are capable of not only easily absorbing discharge noise generated from an engine and noise caused by air flow, but also easily blocking foreign matters such as water or dust from the outside by winding a film member-integrated non-woven fabric, a nylon wire, and a hot melt into the air duct, in which the film member-integrated non-woven fabric is formed by integrally and closely bonding the non-woven fabric on a film member after spreading an adhesive on the film member.

In the conventional sound-absorbing air duct manufactured using various synthetic resins as described above, volatile organic compounds (VOCs) are released during incineration of polyvinyl chloride (PVC) resin and polyurethane (PU) resin. Recycling thereof was impossible because separation between materials thereof was impossible.

SUMMARY OF THE INVENTION

The present disclosure has been completed to solve the problems of the prior art as described above. A purpose of the present disclosure is to provide a sound-absorbing air duct for a vehicle containing a polyester fiber having a low melting point, in which the component constituting the sound-absorbing air duct is made of polyester-based resin for easy recycling.

Further, a purpose of the present disclosure is to provide a sound-absorbing air duct for a vehicle containing a polyester fiber having a low melting point, in which the air duct is composed of a film and fibers made of polyester having a low melting point and improved thermal adhesion and heat resistance, such that a separate adhesive material is not required for adhesion between components of the air duct, thereby improving producibility.

One aspect of the present disclosure provides a sound-absorbing air duct for a vehicle containing a polyester fiber having a low melting point, the air duct comprising: a lower non-woven fabric and an upper non-woven fabric sandwiching wires therebetween; and a film made of a polyester resin having a low melting point and disposed on the upper non-woven fabric, wherein each of the lower and upper non-woven fabrics includes a mixture between a first polyester fiber containing a polyester resin having a melting point higher than 250° C. and a second polyester fiber containing a polyester resin having a low melting point and having a softening point of 100° C. to 150° C., wherein the second polyester fiber includes a polyester resin having a low melting point composed of: an acid component including terephthalic acid or an ester-forming derivative thereof; and a diol component including 2-methyl-1,3-propanediol, 2-methyl-1,3-pentanediol, and ethylene glycol.

In one embodiment, a sound-absorbing air duct for a vehicle containing a polyester fiber having a low melting point is provided, in which the first polyester fiber and/or the second polyester fiber includes a fiber having a modified cross-section having a roundness of 50 to 80%.

In one embodiment, the first polyester fiber and/or the second polyester fiber includes a hollow fiber.

In one embodiment, the second polyester fiber for a binder has a core and a sheath surrounding the core, wherein the core is made of a general polyester resin, and the sheath is made of a polyester resin having a low melting point.

In one embodiment, 2-methyl-1,3-pentanediol in the polyester resin having the low melting point constituting the second polyester fiber is contained at a content of 0.01 to 5 mol % based on a total content of the diol components.

In one embodiment, the polyester resin having the low melting point constituting the second polyester fiber has 600 poise or smaller of a difference between a melt viscosity at 220° C. and a melt viscosity at 260° C.

In one embodiment, an adhesive layer is further disposed between the lower non-woven fabric and the upper non-woven fabric, wherein an adhesive layer contains 90% or more of a polyester fiber having a low melting point.

In one embodiment, the polyester fiber having the low melting point constituting the adhesive layer is the same as the polyester resin having the low melting point constituting the second polyester fiber.

In one embodiment, the polyester resin having the low melting point constituting the film is the same as the polyester resin having the low melting point constituting the second polyester fiber.

The present disclosure may realize the sound-absorbing air duct for a vehicle containing a polyester fiber having a low melting point, in which the duct is made of polyester-based resin for easy recycling.

Further, the present disclosure may realize a sound-absorbing air duct for a vehicle containing a polyester fiber having a low melting point, in which the air duct is composed of a film and fibers made of polyester having a low melting point and improved thermal adhesion and heat resistance, such that a separate adhesive material is not required for adhesion between components of the air duct, thereby improving producibility.

DETAILED DESCRIPTION OF THE PREFERRED EMBODIMENT

Figure 1:
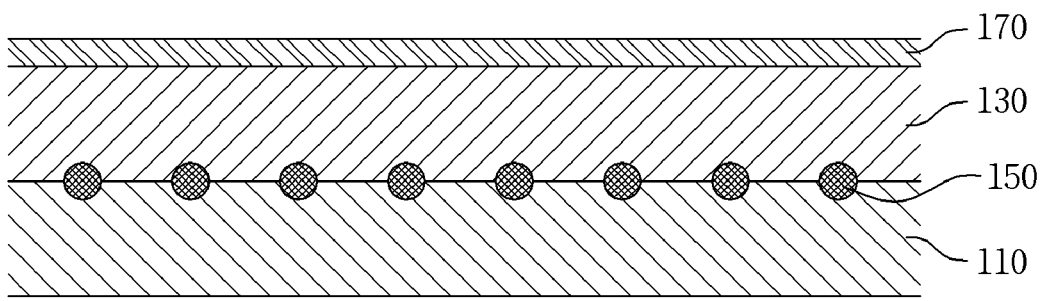
FIG. 1 is a view showing a cross section of one embodiment of a sound-absorbing air duct for a vehicle according to the present disclosure.

Hereinafter, one preferred embodiment of the present disclosure will be described in detail with reference to the accompanying drawings in the present disclosure. First, it should be noted that, among the drawings, the same components or parts are indicated using the same reference numerals. In describing the present disclosure, detailed descriptions of related known functions or components are omitted so as not to obscure gist of the present disclosure.

As used herein, the term "substantially," "about," and similar terms are used as terms of approximation and not as terms of degree, and are intended to account for the inherent deviations in measured or calculated values that would be recognized by those of ordinary skill in the art.

Figure 2:
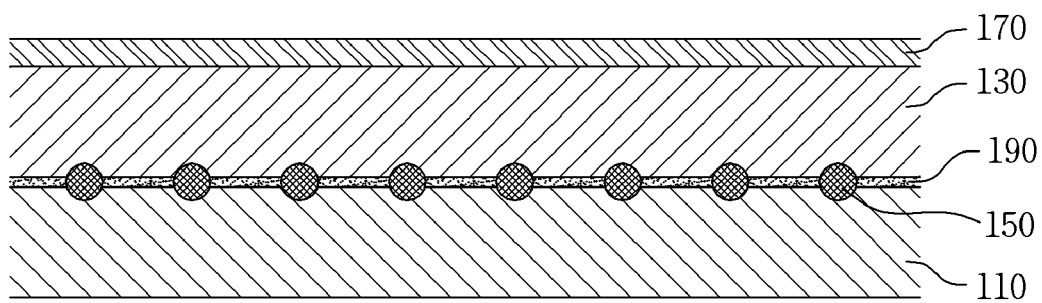
FIG. 2 is a view showing a cross section of another embodiment of a sound-absorbing air duct for a vehicle according to the present disclosure.

FIG. 1 is a view showing a cross section of one embodiment of a sound-absorbing air duct for a vehicle according to the present disclosure. FIG. 2 is a view showing a cross section of another embodiment of a sound-absorbing air duct for a vehicle according to the present disclosure.

As shown in FIG. 1, a sound-absorbing air duct for a vehicle containing a polyester fiber having a low melting point includes a lower non-woven fabric 110 and an upper non-woven fabric 130 sandwiching wires 150 therebetween; and a film 170 made of polyester resin having a low melting point and disposed on the upper non-woven fabric 130.

In this connection, each of the lower and upper non-woven fabrics 110 and 130 includes a mixture between a first polyester fiber containing a polyester resin having a melting point higher than 250° C. and a second polyester fiber containing a polyester resin having a low melting point and having a softening point of 100° C. to 150° C.

The first polyester fiber may include polyethylene terephthalate (PET) composed of terephthalic acid or an ester-forming derivative thereof and ethylene glycol (EG). Alternatively, the first polyester fiber may include a copolymerized polyester resin having a functional compound copolymerized therewith for functionality.

It is noted that the polyester resin having a melting point higher than 250° C. may be any polyester resin having a high melting point.

The second polyester fiber may be made of a polyester resin having a low melting point composed of an acid component including a terephthalic acid or an ester-forming derivative thereof, and diol components including 2-methyl-1,3-propanediol, 2-methyl-1,3-pentanediol, and ethylene glycol (EG).

The second polyester fiber may be formed by spinning the polyester resin having the low melting point alone. Alternatively, the second polyester fiber may include a sheath-core structured composite fiber having a core made of a general polyester resin and a sheath made of a polyester resin having a low melting point to improve physical properties of the second polyester fiber.

When the second polyester fiber includes the sheath-core structured composite fiber, any polyester resin may be used as the general polyester resin that forms the core. However, it is preferable that the polyester resin that forms the core may include a polyethylene terephthalate (PET) composed of terephthalic acid and ethylene glycol. The sheath may be made of a polyester resin having the low melting point.

In 2-methyl-1,3-propanediol of the polyester resin having a low melting point used accordance with the present disclosure, a methyl group is bonded to a second carbon to facilitate rotation of a polymer main chain and acts as if it is an end of the polymer, thus expanding a free space between main chains, thereby increasing flowability of an entire molecular chain. This makes the polymer amorphous and thus allows the diol component to have the same thermal properties as that of isophthalic acid. The flexible molecular chain present in the polymer main chain improves elasticity and thus plays a role in improving the tearing property when binding the non-woven fabrics to each other.

That is, 2-methyl-1,3-propanediol contains methyl groups (—$CH_3$) as side chains binding to the ethylene chain bound to terephthalate, thereby securing a space to allow the main chain of the polymerized resin to rotate, thus inducing an increase in the degree of freedom of the main chain and a decrease in crystallinity of the resin to control the softening point (Ts) and/or the glass transition temperature (Tg). This may exhibit the same effect as that achieved when using isophthalic acid (IPA) containing an asymmetric aromatic ring to lower the crystallinity of the conventional crystalline polyester resin.

Like the 2-methyl-1,3-propanediol, the 2-methyl-1,3-pentanediol has a methyl group bonded to a second carbon to facilitate rotation of the polymer main chain and impart low melting point properties to the polyester resin. the 2-methyl-1,3-pentanediol has a molecular chain longer than that of 2-methyl-1,3-propanediol, thereby to increase a melt viscosity of the polyester resin while preventing the melt viscosity from rapidly decreasing at high temperatures.

In the polyester resin having a low melting point in accordance with the present disclosure having the above diol components, the 2-methyl-1,3-propanediol is preferably contained at a content of 20 to 50 mol % based on a total content of the diol components of the polyester resin having the low melting point in order to achieve the low melting point properties and improve the adhesion.

When the 2-methyl-1,3-pentanediol is contained in a content of less than 0.01 mol % based on the total content of the diol components, the effect of improving the melt viscosity is negligible. When the 2-methyl-1,3-pentanediol is contained in a content greater than 5 mol % based on the total content of the diol components, the melt viscosity may increase rapidly and the spinning processability may decrease. Thus, 2-methyl-1,3-pentanediol may be preferably contained at 0.01 to 5 mol % based on the total content of the diol components.

Most preferably, the 2-methyl-1,3-pentanediol may be contained at 0.05 to 2 mol %, based on the total content of the diol components.

The polyester resin having a low melting point containing 2-methyl-1,3-pentanediol has 600 poise or smaller of a difference between a melt viscosity at 220° C. and a melt viscosity at 260° C. such that the melt viscosity may not rapidly decrease at high temperatures.

The smaller the difference between the melt viscosity at 220° C. and the melt viscosity at 260° C. of the polyester resin having the low melting point, the more preferable. More preferably, the difference may be smaller than or equal to 500 poise.

When the second polyester fiber includes the sheath-core structured composite fiber having the sheath composed of the polyester resin having the low melting point, the general polyester resin constituting the core may have a melt viscosity of 2,000 to 4,000 poise at 280° C., and the polyester resin of the sheath may preferably have a melt viscosity of 500 to 1,400 poise at 260° C., in order to secure spinnability of the composite fiber in the spinning process.

When the melt viscosity of the general polyester resin of the core is too high, spinning processability may deteriorate, resulting in cutting. When the melt viscosity of the core is lower than that of the sheath polyester resin, the morphological stability of the composite fiber may deteriorate. That is, the sheath-core structured cross-section may not be shaped. Thus, the general polyester resin of the core may preferably have a melt viscosity of 2,000 to 4,000 poise at 280° C.

When the melt viscosity of the polyester resin having a low melting point constituting the sheath is too high, the morphological stability of the composite fiber may be deteriorated. When the melt viscosity of the sheath is too low, cross-section unevenness, curve, and cutting may occur. Thus, the sheath polyester resin preferably has a melt viscosity of 260° C. to 600 to 1,500 poise. It may be preferable that the melt viscosity at 260° C. thereof is 700 poise or higher.

It is advantageous that the difference between the melt viscosity of the general polyester resin forming the core and the melt viscosity of the polyester resin forming the sheath is in a predefined range to improve the morphological stability and spinning processability of the composite fiber. The difference between the melt viscosity at 280° C. of the general polyester resin forming the core and the melt viscosity at 260° C. of the polyester resin forming the sheath is preferably 700 to 2,500 poise, more preferably, 1,000 to 2,000 poise.

The polyester resin having a low melting point in accordance with the present disclosure containing 2-methyl-1,3-propanediol and 2-methyl-1,3-pentanediol as described above has the softening temperature of 100° C. to 150° C., and the glass transition temperature of 50° C. to 90° C., and has an intrinsic viscosity of 0.50 dl/g or greater. Thus, the polyester resin has a excellent physical properties.

The first polyester fiber, or the second polyester fiber, or the first polyester fiber and the second polyester fiber may include a fiber having a modified cross-section having a roundness of 50 to 80% to increase sound-absorbing ability.

The first polyester fiber or/and the second polyester fiber may include any fiber having a modified cross-section having a roundness of 50 to 80% and may preferably include a fiber having a modified cross-section having 3 to 8 leaves. In order to improve productivity, it is most desirable for the modified cross-section to have 4 leaves (cross shaped) or five or six leaves (star-shaped).

Further, the first polyester fiber, or the second polyester fiber, or the first polyester fiber and the second polyester fiber may include a hollow fiber to increase the sound-absorbing ability.

The first polyester fiber and the second polyester fiber may have a fineness and a fiber length which may be adjusted according to the size of the air duct. The fineness and the fiber length thereof may be 0.5 to 6 denier, and 5 to 100 mm, respectively.

Each of the lower and upper non-woven fabrics is made of the mixture of the first polyester fiber and the second polyester fiber such that the first and second polyester fibers are partially fused with each other. The form in which the fibers are partially fused with each other may be achieved via application of pressure and/or heat in a process of forming a fiber layer via thermoforming.

The first polyester fiber and the second polyester fiber are preferably mixed with each other in a weight ratio of 2:8 to 8:2. When the content of the second polyester fiber is low, the partial fusion between the fibers is weak such that the morphological stability may be reduced. When the content of the second polyester fiber is high, physical properties such as strength of the non-woven fabric may be deteriorated.

Each of the lower and upper non-woven fabrics may be formed by forming a fiber layer in which the first polyester fiber and the second polyester fiber are uniformly mixed with each other, and thermoforming the fiber layer at 100 to 200° C. to form the partial fusion between the fibers into in a certain shape.

The lower and upper non-woven fabric may bond to each other via a heat bonding process while the wires are interposed therebetween. In this connection, as the adhesion may be deteriorated due to the wires, the adhesion between the lower and upper non-woven fabrics may be increased by disposing an adhesive layer 190 between the lower non-woven fabric and the upper non-woven fabric, as shown in FIG. 2.

The adhesive layer 190 may include a thin non-woven fabric containing 90% or more of polyester fiber having a low melting point. In this connection, the polyester fiber having the low melting point may preferably be the same as the second polyester fiber.

The wires 150 maintain the shape of the air duct and may include a wire made of a polyamide-based resin or a wire made of a polyester-based resin. In accordance with the present disclosure, it would be desirable that the wire may include a wire made of the polyester-based resin to increase recyclability.

The film 170 is attached to the upper non-woven fabric 130 to block foreign matters from invading the air duct. It may be preferable that the film 170 is made of a polyester resin having a low melting point as suitable for thermal bonding to the upper non-woven fabric 130 without using an adhesive.

The polyester resin having a low melting point forming the film 170 may be preferably a polyester resin having a low melting point contained in the second polyester fiber.

The sound-absorbing air duct for a vehicle containing a polyester fiber having a low melting point according to the present disclosure, which includes the lower non-woven fabric 110, the wires 150, the upper non-woven fabric 130, and the film 170 as described above may be manufactured by sequentially stacking the upper non-woven fabric 130, the wires 150, and the lower non-woven fabric 110 on the film 170 and then attaching the components to each other via a thermal compression process.

In order to improve productivity, a shape of each of the lower non-woven fabric 110 and the upper non-woven fabric 130 may be fixed via a needle punching process before the lower non-woven fabric 110 and the upper non-woven fabric 130 are stacked over the film 170.

Further, when the adhesive layer 190 is contained between the lower non-woven fabric 110 and the upper non-woven fabric 130, the adhesive layer 190 may be stacked on the upper non-woven fabric 130, or the adhesive layer 190 may be stacked on the wires 150 such that the adhesive layer 190 is disposed between the lower non-woven fabric 110 and the upper non-woven fabric 130.

In this way, the present disclosure may realize the sound-absorbing air duct for a vehicle containing a polyester fiber having a low melting point, in which the air duct includes the none-woven fabric to sound-absorb noises generated from the engine or noises caused by air flow. The most components of the air duct are made of polyester-based resin for easy recycling.

Further, in this way, the present disclosure may realize a sound-absorbing air duct for a vehicle containing a polyester fiber having a low melting point, in which the air duct is composed of the film and the fibers made of polyester having a low melting point and improved thermal adhesion and heat resistance, such that a separate adhesive material is not required for adhesion between the components of the duct, thereby improving producibility.

Hereinafter, Examples of a method for producing a sound-absorbing air duct for a vehicle containing a polyester fiber having a low melting point according to the present disclosure are set forth. However, the present disclosure is not limited to Examples.

Second Polyester Fiber Production

Preparation Examples 1 to 6

Polyethylene terephthalate having a melt viscosity of about 2,300 poise at 280° C. was used as the core. The sheath was made of the polyester resin having the low melting point. Thus, the polyester fiber acting as a binder with improved processability in accordance with the present disclosure was produced via a general composite spinning process at a weight ratio of the sheath and the core of 50:50.

The polyester resin having the low melting point was produced as follows: terephthalic acid (TPA) and ethylene glycol (EG) was added to an ester reaction tank, and a typical polymerization reaction occurred therein at 258° C., such that polyethylene terephthalate polymer (PET oligomer) was produced at a reaction rate of about 96%. 2-Methyl-1,3-propanediol was added to the produced polyethylene terephthalate (PET) at a content of about 42 mol % based on the total content of the diol components. 2-methyl-1,3-pentanediol was added to the produced polyethylene terephthalate (PET) at a content shown in Table 1 below. A transesterification reaction was performed at 250±2° C. while adding a transesterification reaction catalyst thereto. Thereafter, a condensation polymerization reaction catalyst was added to the obtained reaction mixture. Then, a condensation polymerization reaction was conducted while last temperature and pressure in the reaction tank were adjusted to be 280±2° C. and 0.1 mmHg, respectively.

Comparative Preparation Example 1

Polyethylene terephthalate was used as the core as in Preparation Example 1. The polyester resin having a low melting point constituting the sheath employed the terephthalic acid (66.5 mol %) and isophthalic acid (33.5 mol %) as the acid components and diethylene glycol (10.5 mol %) and ethylene glycol (89.5 mol %) as the diol components.

Comparative Preparation Example 2

Polyethylene terephthalate was used as the core as in Preparation Example 1. The polyester resin with the low melting point constituting the sheath employed terephthalic acid as the acid component and 2-methyl-1,3-propanediol (42.5 mol %) and ethylene glycol (57.5 mol %) as the diol components.

TABLE 1

| Examples | Softening point (° C.) | Tg (° C.) | IV (dl/g) | 2-methyl-1,3-pentanediol (mol %) | Melt viscosity 220° C. | Melt viscosity 240° C. | Melt viscosity 260° C. |
|---|---|---|---|---|---|---|---|
| Preparation Example 1 | 122 | 60.9 | 0.561 | 0.1 | 1254 | 1019 | 783 |
| Preparation Example 2 | 119 | 61.8 | 0.562 | 0.5 | 1314 | 1078 | 864 |
| Preparation Example 3 | 120 | 61.9 | 0.562 | 1.0 | 1528 | 1387 | 1196 |
| Preparation Example 4 | 123 | 63.5 | 0.562 | 2.0 | 2271 | 1739 | 1444 |
| Preparation Example 5 | 123 | 64.8 | 0.563 | 3.5 | 2833 | 2571 | 2213 |
| Preparation Example 6 | 126 | 67.3 | 0.561 | 5.0 | 3341 | 3041 | 2733 |
| Comparative Preparation Example 1 | 113 | 56.8 | 0.563 | 0 | 1011 | 739 | 467 |
| Comparative Preparation Example 2 | 121 | 61.5 | 0.561 | 0 | 1197 | 992 | 664 |

As shown in Table 1, it may be seen that the melt viscosity increases as the content of 2-methyl-1,3-pentanediol increases. it may be seen that all the melt viscosities at 260° C. of the Preparation Examples 1 to 6 are maintained at a high melt viscosity greater than or equal to 700 poise at a high temperature. Further, it may be seen that in Preparation Examples 2 to 4 in which 2-methyl-1,3-pentanediol is contained at 0.5 to 2 mol % based on the total content of the diol components, the difference between the melt viscosity at 220° C. and the melt viscosity at 260° C. is 300 to 500 poise which is lower than 684 and 674 poise as the differences in Comparative Preparation Examples 1 and 2, respectively.

Further, it may be seen that as shown in Preparation Examples 5 and 6 in which 2-methyl-1,3-pentanediol is contained in 3 mol % or more based on the total content of the diol components, the melt viscosity at 260° C. rapidly increases to a value equal to or higher than 2,000 poise.

Measurement of Physical Properties of Fibers of Preparation Examples and Comparative Preparation Examples Following physical properties of the polyester resin having a low melting point and the polyester fiber for the binder as produced in the Preparation Examples and Comparative Preparation Examples were measured, and the results are shown in Tables 1 and 2.

(1) Measurement of Softening Point (or Melting Point) and Glass Transition Temperature (Tg)

The glass transition temperature (Tg) of the copolymerized polyester resin was measured using a differential scanning calorimeter (Perkin Elmer, DSC-7). The softening behavior was measured in a TMA mode using a dynamic mechanical analyzer (DMA-7, Perkin Elmer).

(2) Intrinsic Viscosity (IV) Measurement

After the polyester resin was dissolved, at a concentration of 0.5% by weight, in a solution in which phenol and tetrachloroethane were mixed with each other at a 1:1 weight ratio, intrinsic viscosity (I.V) thereof was measured at 35° C. using Ubbelohde Viscometer.

(3) Melt Viscosity Measurement

After the polyester resin was melted at a measurement temperature, melt viscosity was measured using RDA-III from the Rheometric Scientific company. Specifically, a value at 100 rad/s was calculated as the melt viscosity while setting a frequency from Initial Frequency=1.0 rad/s to Final Frequency=500.0 rad/s under a frequency sweep condition at the set temperature.

(4) Compressive Hardness Measurement 5 g of polyester fiber was spread and stacked to a height of 5 cm in a circular molding frame having a diameter of 10 cm, and then was heat-bonded to each other at a set temperature for 90 seconds to manufacture a cylindrical shaped article. The manufactured molded article was compressed by 75% using Instron to measure a load applied for compression. A compressive hardness was measured based on the load. In this experiment, the heat-bonding temperature was set to 140° C., 150° C., and 160° C., respectively, and the compressive hardness was measured by heat-bonding at each set temperature.

(5) Spinning Yield (%, 24 hr) Measurement

An amount of polyester resin as used for 24 hours and an amount of spun fiber were measured and then spinning yield was calculated based on a following formula:

Spinning yield (%)=(amount of spun fiber (kg)/ amount of PET resin as used (kg))×100

(6) Measurement of Adhesion at Room Temperature and High Temperature

Non-woven fabrics having a density of 2 g/100 cm² were prepared by heat-fusing polyester fibers according to Examples and Comparative Examples. Adhesion of each of the prepared non-woven fabrics was measured at 25±0.5° C. (room temperature) and 100±0.5° C. (high temperature) according to ASTM D1424.

(7) Measurement of High Temperature Contractility

The polyester fiber for the binder was formed into short fibers, which in turn were subjected to carding and thus was manufactured into a cylindrical shaped product. After heating the product at 170° C. for 3 minutes, a reduced volume was measured. An original volume was 330 cm³. It may be evaluated that as the volume reduction increases, the morphological stability is not good. When the volume is reduced to 250 cm³ or smaller, the morphological stability is deteriorated. When the volume is reduced to 280 cm³ or greater, the morphological stability is excellent.

TABLE 2

| | Compressive hardness (kgf) | | | Spinning yield | Adhesion | | Morphological stability |
| | | | | | Adhesion at room temperature | Adhesion at high temperature | High temperature contractility |
| Examples | 140° C. | 150° C. | 160° C. | (%, 24 hr) | [kgf] | [kgf] | [cm³] |
| --- | --- | --- | --- | --- | --- | --- | --- |
| Example 1 | 0.55 | 0.72 | 0.98 | 98.5 | 56.2 | 4.1 | 268 |
| Example 2 | 0.57 | 0.79 | 1.07 | 99.2 | 57.4 | 4.3 | 271 |
| Example 3 | 0.62 | 0.88 | 1.21 | 99.3 | 57.3 | 4.7 | 275 |
| Example 4 | 0.61 | 1.24 | 1.36 | 99.5 | 58.1 | 4.9 | 281 |
| Example 5 | 0.73 | 1.39 | 1.55 | 95.6 | 58.3 | 5.1 | 274 |
| Example 6 | 0.76 | 1.54 | 1.86 | 91.3 | 57.2 | 5.2 | 271 |
| Comparative Example 1 | 0.41 | 0.57 | 0.74 | 97.8 | 55.3 | 3.2 | 254 |
| Comparative Example 2 | 0.52 | 0.73 | 0.91 | 98.1 | 55.7 | 3.9 | 260 |

The higher the compressive hardness, the better the thermal adhesion between the fibers of the molded article. It may be seen as shown in Table 2 that Preparation Examples 1 to 6 as polyester fibers having a low melting point in accordance with the present disclosure have higher compressive hardness and thus excellent heat-bonding ability than those of Comparative Preparation Examples 1 and 2. Polyester resin with low melting point according to Examples 1 to 6 and Comparative Examples have excellent room temperature adhesion of 55 kfg or higher. It may be seen that Examples 1 to 6 in accordance with the present disclosure have better adhesion than those of Comparative Examples 1 and 2. In particular, in Preparation Examples 1 to 6, the high temperature adhesion is superior to those of the Comparative Examples. Examples according to the present disclosure have the high temperature adhesion of 4.1 to 5.2 kgf, whereas those of the Comparative Preparation Examples have 3.2 and 3.9 kgf. Thus, it may be seen that Examples in accordance with the present disclosure have excellent high temperature adhesion.

Further, all Preparation Examples 1 to 6 and Comparative Examples exhibit a good level of high temperature contractility of 260 cm³ or greater. It may be seen that Preparation Examples 1 to 6 are superior to Comparative Preparation Examples 1 and 2 in terms of the high temperature contractility.

Further, Preparation Examples 2 to 4 in which the difference between the melt viscosity at 220° C. and the melt viscosity at 260° C. is small have higher values in the spinning yield. Thus, it may be seen that the polyester fiber with a low melting point in accordance with the present disclosure has excellent processability and thus improved heat-bonding ability due to high processability.

In particular, Preparation Examples 2 to 4 containing 2-methyl-1,3-pentanediol at 0.5 to 2.0 mol % based on the total content of the diol components have a spinning yield of 99% or higher, and have excellent in both room temperature adhesion and high temperature adhesion and have excellent high temperature shrinkage. Thus, it is preferable that the 2-methyl-1,3-pentanediol is contained in 0.5 mol % to 2.0 mol % based on the total content of the diol components.

Manufacturing of Sound-Absorbing Air Duct for Vehicle

Examples 1 to 5

A film was formed using the polyester resin having the low melting point of Preparation Example 3 as described above. For the lower and upper non-woven fabrics, the first polyester fiber employed a fiber with a six-leaves cross-section (68% roundness) and made of polyethylene terephthalate with a melting point of about 265° C. The second polyester fiber employed a hollow fiber made of the polyester fiber having the low melting point of Preparation Example 3. The wire was made of polyester-based fiber.

For the lower and upper non-woven fabrics, the first polyester fiber had a fineness of 1.4 denier and a fiber length of 6 mm. The second polyester fiber had a fineness of 2 denier and a fiber length of 6 mm. The 30% by weight of the first polyester fiber and 70% by weight of the second polyester fiber were mixed with each other and then the mixture was formed into a non-woven fabric form using a needle punching process. Thus, the lower and upper non-woven fabrics were prepared.

The sound-absorbing air duct for a vehicle was manufactured by sequentially laminating the upper non-woven fabric, the wires, and the lower non-woven fabric on the film, and then attaching the components to each other via a thermal compression process.

Example 2

The air duct was manufactured in the same way as in Example 1 above, except that a fiber having a four-leaves cross-section (74% roundness) was used as the first polyester fiber.

Example 3

The air duct was manufactured in the same way as in Example 1 above, except that a circular cross-section fiber was used as the second polyester fiber.

Example 4

The air duct was manufactured in the same way as in Example 1 above, except that a fiber having a circular cross-section (100% roundness) was used as the first polyester fiber.

Example 5

The air duct was manufactured in the same way as in Example 1 above, except that a circular cross-section (100% roundness) fiber was used as the first polyester fiber, and a circular cross-section fiber was used as the second polyester fiber.

Comparative Example

A film was made of PU film formed of a polyurethane-based resin, wire was made of nylon, and the lower and upper non-woven fabrics were manufactured using only circular cross-section fibers made of polyethylene terephthalate with a melting point of about 265° C. In this way, the non-woven fabric was manufactured using the needle punching process.

Then, the wire, PET hot melt and the upper non-woven fabric were sequentially stacked on the lower non-woven fabric and then the PET hot melt was melted via a thermo-compression bonding process to bond the lower and upper non-woven fabrics to each other. Then, a binder was applied on the upper non-woven fabric which was attached to the PU film to produce a sound-absorbing air duct for a vehicle.

Adhesion and Sound-Absorbing Ability Evaluation of Examples and Comparative Example Table 3 shows the adhesiveness and sound-absorbing ability of Examples 1 to 5 and Comparative Example as manufactured above.

Measurement of Room Temperature and High Temperature Adhesions

For an experiment to measure adhesion of the lower and upper non-woven fabrics, each of the sound-absorbing air ducts for a vehicle of Examples and Comparative Example was measured in terms of 25±0.5° C. (room temperature) adhesion and 100±0.5° C. (high temperature) adhesion according to ASTM D1424.

Measurement of Sound-Absorbing Ability Via Reverberation Chamber Method

Each of the sound-absorbing air ducts for a vehicle of Examples and Comparative Example was measured in terms of the sound-absorbing ability using an apparatus complying to ISO 354 (KS F 2805: Method for measuring sound-absorbing ability in reverberation chamber). A size of a test piece was 1.0 m×1.2 m. The reverberation time duration was set such that an initial sound pressure was attenuated to 20 dB compared. A sound source was a ⅓ Octave band sound source. The sound-absorbing ability was measured in 0.8 to 8 kHz of the frequency range.

Figure 3:
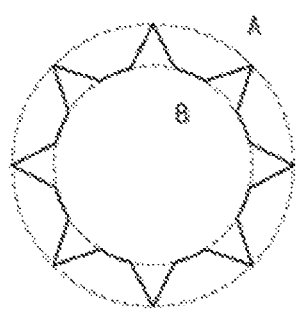
FIG. 3 illustrates an example of the definition of Roundness (%).

Roundness: Ratio between areas of circumscribed and inscribed circles of cross section of fiber For example, as shown in FIG. 3, Roundness (%)=Area of inscribed circle (B)/area of circumscribed circle (A) area× 100

The smaller the roundness, the higher the cross-sectional modification.

TABLE 3

| | | Examples | | | | | Comparative Example |
|---|---|---|---|---|---|---|---|
| | | Example 1 | Example 2 | Example 3 | Example 4 | Example 5 | |
| Adhesion (kfg) | Adhesion at room temp | 66 | 65 | 62 | 63 | 63 | 62 |
| | Adhesion at high temp | 4.7 | 4.4 | 4.5 | 4.4 | 4.5 | 4.2 |
| Frequency (kHz) | 0.8 | 0.96 | 0.93 | 0.93 | 0.88 | 0.82 | 0.91 |
| | 1.0 | 0.91 | 0.87 | 0.88 | 0.86 | 0.81 | 0.89 |
| | 1.25 | 0.89 | 0.88 | 0.86 | 0.85 | 0.80 | 0.86 |
| | 1.6 | 0.86 | 0.84 | 0.81 | 0.82 | 0.74 | 0.83 |
| | 2.0 | 0.86 | 0.82 | 0.80 | 0.81 | 0.66 | 0.82 |
| | 2.5 | 0.84 | 0.81 | 0.79 | 0.78 | 0.62 | 0.81 |
| | 3.15 | 0.83 | 0.78 | 0.76 | 0.72 | 0.58 | 0.80 |
| | 4.0 | 0.82 | 0.77 | 0.76 | 0.73 | 0.57 | 0.79 |
| | 5.0 | 0.80 | 0.77 | 0.75 | 0.73 | 0.51 | 0.78 |
| | 6.3 | 0.79 | 0.76 | 0.74 | 0.72 | 0.51 | 0.76 |
| | 8.0 | 0.79 | 0.74 | 0.71 | 0.68 | 0.53 | 0.74 |

It may be seen as shown in Table 3 that adhesion at both room temperature and high temperature of each of Examples 1 to 5 according to the present disclosure in which the lower and upper fabrics are made of the non-woven fabric containing the polyester fiber having a low melting point is similar to adhesion at both room temperature and high temperature of the Comparative Example in which the upper and lower fabrics were bonded to each other using the PET hot melt, and thus the adhesion between the non-woven fabrics containing the polyester fibers having a low melting point is excellent.

Further, it may be seen that Examples 1 to 5 using the film made of the polyester resins with the low melting point have higher sound-absorbing effects than that of Comparative Example using the PU film. Further, it may be seen that the sound-absorbing ability is improved when the cross-section of the fiber forming the non-woven fabric is the 4 or 6 leaves modified cross-section or is hollow.

REFERENCE NUMERALS

110: Lower non-woven fabric
130: Upper non-woven fabric
150: Wire
170: Film
190: Adhesive layer

What is claimed is:

1. A sound-absorbing air duct for a vehicle containing a polyester fiber having a low melting point, the duct comprising:
   a lower non-woven fabric and an upper non-woven fabric sandwiching wires therebetween; and
   a film made of a first polyester resin having a low melting point and directly disposed on the upper non-woven fabric,
   wherein each of the lower and upper non-woven fabrics includes a mixture of:
      a first polyester fiber containing a second polyester resin having a melting point higher than 250° C.; and
      a second polyester fiber containing a third polyester resin having a low melting point and having a softening point of 100° C. to 150° C.,
   wherein the second polyester fiber is a sheath-core structured composite fiber having a core and a sheath surrounding the core,
   wherein the core is made of a polyethylene terephthalate (PET) composed of terephthalic acid and ethylene glycol, and the sheath is made of the third polyester resin,
   wherein the sheath includes the third polyester resin composed of:
      an acid component including terephthalic acid or an ester-forming derivative thereof; and
      a diol component including 2-methyl-1,3-propanediol, 2-methyl-1,3-pentanediol, and ethylene glycol,
   wherein the third polyester resin has a melt viscosity of 700 poise to 1,500 poise at 260° C.,
   wherein 2-methyl-1,3-pentanediol in the third polyester resin is contained at a content of 0.01 to 5 mol % based on a total content of the diol components, and
   wherein 2-methyl-1,3-propanediol in the third polyester resin is contained at a content of 42 to 50 mol % based on a total content of the diol components.

2. The sound-absorbing air duct of claim 1, wherein the first polyester fiber and/or the second polyester fiber includes a fiber having a modified cross-section having a roundness of 50 to 80%.

3. The sound-absorbing air duct of claim 1, wherein the first polyester fiber and/or the second polyester fiber includes a hollow fiber.

4. The sound-absorbing air duct of claim 1, wherein the third polyester resin has 600 poise or smaller of a difference between a melt viscosity at 220° C. and a melt viscosity at 260° C.

5. The sound-absorbing air duct of claim 1, wherein an adhesive layer is further disposed between the lower non-woven fabric and the upper non-woven fabric,
   wherein the adhesive layer contains 90% or more of a fourth polyester fiber having a low melting point.

6. The sound-absorbing air duct of claim 5, wherein the fourth polyester fiber is the same polyester fiber used as the third polyester resin.

7. The sound-absorbing air duct of claim 1, wherein the first polyester resin having the low melting point constituting the film is the same as the third polyester resin having the low melting point constituting the second polyester fiber.

* * * * *